United States Patent [19]

Doyle

[11] Patent Number: 4,569,504

[45] Date of Patent: Feb. 11, 1986

[54] SOLENOID

[76] Inventor: Michael J. Doyle, 2705 Calle Loma Roja, Riverside, Calif. 92503

[21] Appl. No.: 496,495

[22] Filed: May 20, 1983

[51] Int. Cl.$^4$ .......................... F16K 31/02; H01F 3/00
[52] U.S. Cl. ................................ 251/129.15; 335/279
[58] Field of Search ....................... 335/279, 261, 255; 251/129, 141

[56] References Cited

U.S. PATENT DOCUMENTS

| 1,333,542 | 3/1920 | Geissinger | 335/279 |
| 1,582,986 | 5/1926 | Harris | 335/279 |
| 2,690,529 | 9/1954 | Lindblad | 335/261 |

FOREIGN PATENT DOCUMENTS 551790  3/1943  United Kingdom ................ 335/261

Primary Examiner—William E. Lyddane
Assistant Examiner—Gerald A. Anderson
Attorney, Agent, or Firm—Knobbe, Martens, Olson & Bear

[57] ABSTRACT

A solenoid which has a coil, a ferromagnetic core extending completely through the center of the coil and a ferromagnetic upper pole formed integrally with the core at the lower end of the coil. The upper pole having a diameter larger than the diameter of the core but smaller than the outer diameter of the coil. A plunger mounted for movement towards and away from the upper pole. The plunger is operably connected to a mass flow control valve and spring biased towards a closed position away from the upper pole. The plunger has a diameter greater than its length and a set of concentric cylindrical ridges extending downwardly to interleave with a corresponding set of upwardly extending concentric cylindrical ridges on a lower pole. An outer, square ferromagnetic casing completes the magnetic circuit by extending from the upper end of the core to the outer surface of the lower pole. The interleaving ridges provide a large surface area for transfer of magnetic flux from the lower pole to the plunger. Two non-magnetic disk springs act to bias the plunger toward closure of the valve, to prevent latching by stopping the plunger from too close an approach to the upper pole, and to hold the plunger in a central position to eliminate friction. The ends of the ridges are grooved to reduce unwanted attraction between the plunger and the lower pole.

48 Claims, 6 Drawing Figures

U.S. Patent  Feb. 11, 1986  Sheet 1 of 2  4,569,504
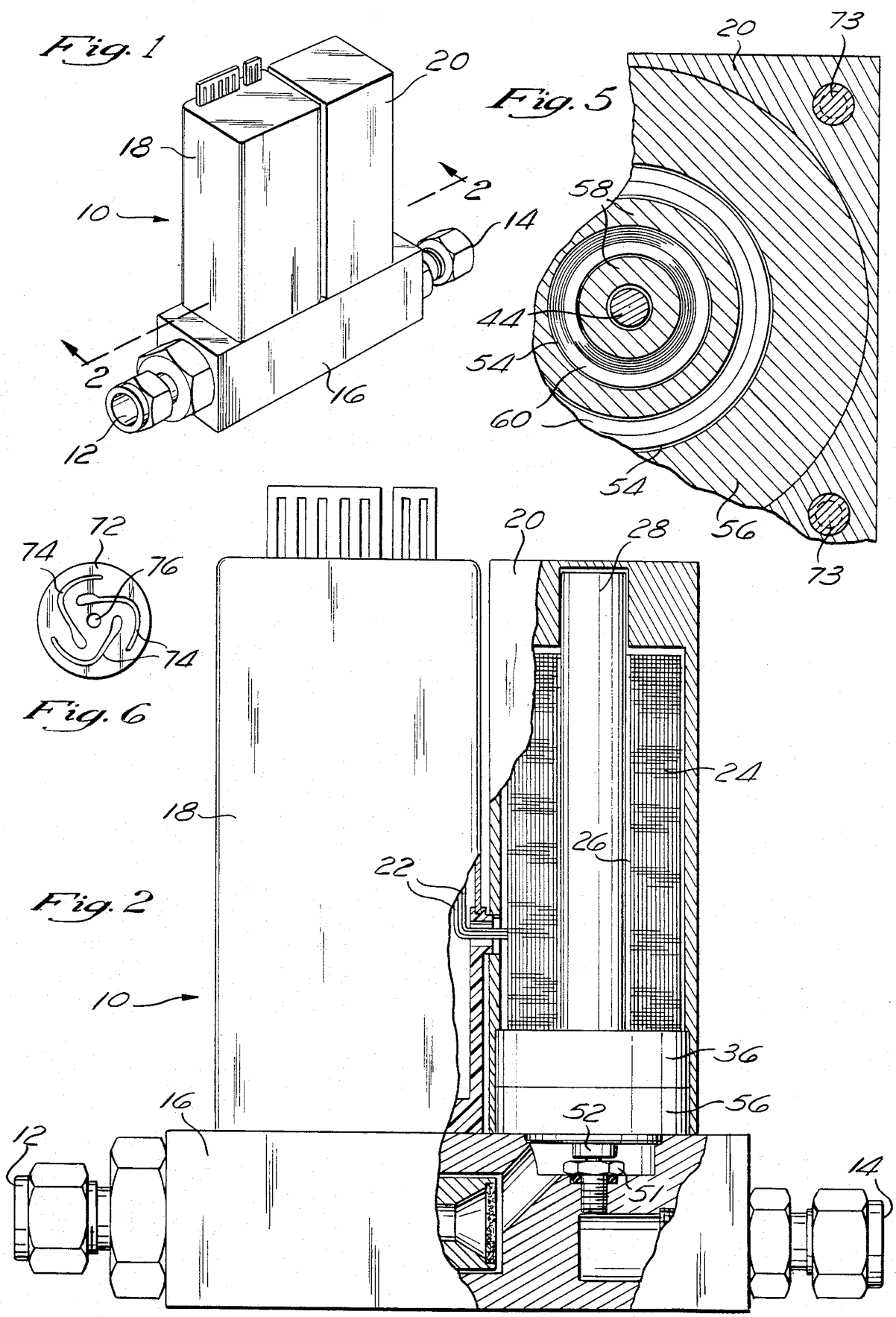

SOLENOID

BACKGROUND OF THE INVENTION

This invention relates to solenoids and in particular solenoids which are specially adapted for use in mass flow control valves.

Mass flow control valves are used to provide very precise flows of liquids and/or gasses. One common use is in providing the proper flow of gas needed to dope the silicon used for semi-conductors and integrated circuits. Another use of these precise flow control valves is in the manufacture of optical fibers.

The precise flow control needed is provided in a number of ways in the prior art. These include needle valves, motor valves, heater valves, and solenoid valves. In each case there must be constant monitoring of the flow of liquid or gas through the valve and changes made to the valve aperture when the flow has increased or decreased beyond an acceptable level. In selecting a valve for use as a mass flow controller, it is important to keep in mind the environment in which the valve will be operating, how precise the flow must be and the cost of the valve. Additionally, if the gas or liquid flowing through the valve is corrosive, a corrosion resistant valve should be selected.

Solenoid valves presently in common use as mass flow controllers typically include a solenoid having a coil and a ferromagnetic plunger located within the center of the coil. When current flows through the coil, a magnetic field is created which acts to draw the ferromagnetic plunger within the coil. The plunger is typically connected to a valve member such that as the plunger is drawn into the solenoid coil, the valve member is drawn away from the valve aperture in the valve seat, opening the valve further. In order to prevent opening of the valve when no current flows through the coil, the plunger is typically spring-biased to a closed valve position. The more current flowing through the coil the higher the magnetic field and the stronger the force pulling the ferromagnetic plunger into the coil. Thus, it is possible to control the flow through the valve by increasing or decreasing the current flowing through the coil and thus increasing or decreasing the force exerted on the plunger against the biasing spring. The length of the stroke through which the plunger moves is typically of the order of 0.060 inches.

The efficiency of the simple solenoid structure described above can be vastly improved by making some fairly simple modifications. The solenoid, as modified, will be referred to as "the conventional solenoid". It is well known that the placing of a piece of ferromagnetic material in a magnetic field acts to increase the strength of the magnetic field. Typically a stationary ferromagnetic core is placed in the upper portion of the center of the coil. As a result, the magnetic field which acts on the plunger with the same amount of current flowing through the coil is substantially increased over that of the simple solenoid described above without the core. The increased field means an increased force upward on the plunger. This force, for the same amount of current flowing through the coil, can be further increased by surrounding the coil with a ferromagnetic casing. The casing should be very close to and preferably in contact with the upper portion of the core and at the other end of the coil the casing should come as close as possible to the plunger itself. The casing provides a return path for the magnetic flux flowing from the top of the core around the outside of the coil and into the plunger. The ferromagnetic plunger, like the core, acts to increase the magnetic field. This increase is enhanced by the proximity of the ferromagnetic casing.

The efficiency improvements over the simple solenoid made by the above changes are substantial and have made the conventional solenoid a useful means of controlling the flow through a valve. However, for some applications the power requirements, even after incorporating the above efficiency measures into the simple solenoid, are such that the size of the valve structure (including the solenoid coil) is unacceptably large. It has also been found that when conventional solenoid valves are used in vibration-filled environments the controlability of the valve is substantially impaired due to the large mass of the plunger and generally low mechanical frequency response of these valves. If the resonant frequency of the solenoid is generated, for example, due to the nearby use of a vacuum pump, the solenoid casing will begin to move at a different rate than the plunger causing the valve seat to vibrate and in turn changing the valve aperture. Depending on the application and the degree of variation in the flow through the valve this problem can make use of the solenoid valve unacceptable. Additionally, for some applications, the power requirements of the conventional solenoid have been found to be too high.

SUMMARY OF THE INVENTION

The instant invention substantially improves the standards of efficiency for solenoids over that obtained by the conventional solenoid described above. This improvement in efficiency can be used in the design of solenoids and, in particular, solenoid controlled mass flow control valves to overcome all of the disadvantages discussed above with respect to conventional solenoids. Due to the increase in efficiency, it is clear that if the coil size and current flowing through the coil are held constant, the force on the plunger in the invention solenoid will be higher than in the conventional solenoid. Thus, the same results can be accomplished using less power and in turn generating less heat. The increase in efficiency can also be used to increase the frequency response and thus make the invention solenoid useful under vibration conditions which would have been unacceptable for conventional solenoids. This can be accomplished by using a stiffer biasing spring which in combination with increased magnetic attraction force will substantially increase the frequency response. The displacement for a given increase in current would remain the same even with the stiffer spring due to increased magnetic attraction force. Another example of the use of the increased efficiency would be to reduce the size of the coil but still obtain the same force on the plunger for a given current passing through the coil. Thus, the instant invention permits the use of solenoid controlled mass flow control valves in applications where previously a conventional solenoid controlled mass flow control valve could not be used. Further, it is clear that this increase in efficiency can be used to advantage wherever solenoids have been used in the past, whether as on/off or control solenoids.

The increase in efficiency is obtained by maximizing the various structural factors that go into determining the amount of force which will be exerted by the solenoid on the plunger. Five major factors have been taken into account in constructing the invention solenoid.

The first factor is the amount of area at the upper surface of the plunger which faces the lower surface of the core. The lower surface of the core when immersed in the field created by the coil will be a magnetic pole. The upper surface of the plunger will be attracted to the core pole both because the plunger is ferromagnetic and because the plunger itself has become a magnet due to the fact that it too is immersed in a magnetic field. The pole of the upper surface of the plunger will be opposite that of the lower surface of the core. Thus, the plunger will be attracted to the lower surface of the core. Generally, the greater the surface area of these two attracting surfaces the greater the attraction force.

The second factor is the distance which the magnetic flux must flow through the plunger. Generally, the longer the flux must flow, the more loss there will be.

The third factor is the mass of the plunger. The lower the mass, the lower the force needed to move the plunger. Also a lower mass plunger means a higher frequency response.

The fourth factor is the distance between the outer ferromagnetic casing which acts at the bottom of the coil as a lower pole and the plunger itself. The shorter the distance between these two elements the greater the amount of magnetic flux that can be transferred.

Finally, the fifth factor is the amount of surface area over which the flux can be transferred from the lower pole to the plunger. Generally, the greater the surface area the more flux can be transferred.

There are however limits on the changes that can be made to each of these factors. For example, if the plunger is made too short to decrease the magnetic flux path, the poles on each side of the plunger will in effect short out and the attracting force will be substantially reduced. Additionally, if the surface area by which the magnetic flux is fed into the plunger is made much greater while keeping the plunger the same size the plunger material itself may saturate and in effect not carry any further increase in flux. Applicant's invention has balanced these considerations to achieve a unique solenoid structure which provides greatly increased efficiency over that of the conventional solenoid.

The invention solenoid like the conventional solenoid has a coil with a core in the center of the coil. In the preferred embodiment, the lower end of the core is flush with the lower end of the coil. Integral with the lower end of the core is an upper pole element. The pole element, like the core, is made of a ferromagnetic material. The upper pole has a diameter greater than the diameter of the opening in the coil but less than the outer diameter of the coil. A plunger is mounted for movement towards and away from the lower flat surface of the upper pole. The plunger has a diameter approximately equal to the diameter of the upper pole and a substantially flat surface facing a similar flat surface on the lower portion of the upper pole. The feature of locating the upper pole just outside of the lower portion of the coil permits the attracting surface area of the upper pole and the plunger to be much greater than in the convention solenoid, where the attracting surface area is limited by the diameter of the opening in the coil.

The upper pole portion which is connected to the core is preferably made of a ferromagnetic stainless steel, while the core itself is made of a higher permeability ferromagnetic material which allows a higher flux density before reaching saturation. The use of stainless steel for the upper pole is desirable because the attracting surface of the pole is exposed to the potentially corrosive fluid or gas flowing through the valve. Adequate attraction force is still provided even though lower permeability stainless steel is used, due to the large surface areas of the plunger and upper pole. Under some conditions where the increased magnetic field created by the higher permeability core is not as important, the entire combination of core and upper pole can be made of one piece of stainless steel having a somewhat lower permeability than the original core material.

The upper end of the core extends beyond the upper end of the coil. An outer can or casing is formed around the coil with a portion of the upper part of the can in close proximity to the upper portion of the core. This permits the flux developed in the core to flow into the can. The can preferably has a square cross section, while the coil is circular. This leaves a substantial volume at the four corners of the can which provides a flux return path for the magnetic flux flowing from the top portion of the core through the ferromagnetic can and down towards the bottom of the coil. The can itself extends beyond the bottom of the coil and is positioned close to a circular, ferromagnetic, stainless steel lower pole. The lower pole has a series of circular, concentric ridges extending upwardly therefrom.

The plunger is mounted between the lower pole and the upper pole for movement towards and away from the upper pole. The plunger is connected to the movable valve member of the valve by a cylindrical element attached to the center of the plunger and extending through an opening in the lower pole. The underside of the plunger has a series of downwardly depending, concentric, cylindrical ridges. These ridges are made so that they interleave closely with the ridges extending upwardly from the lower pole. The sidewalls of the ridges provide a large amount of surface area through which the magnetic flux may pass from the lower pole to the plunger. This acts to increase the attractive force between the plunger and the upper pole. It is extremely important that the gaps between the ridges be extremely small, on the order of 1,000th of an inch.

As the surface of the ridges on the plunger and the ridges on the lower pole will be opposite magnetic poles, they will attract each other. The lateral attractive forces are of no consequence in this situation because the ridges are symmetrical, and the forces will cancel out. However, the vertical forces will act to pull the plunger towards the lower pole against the pull of the upper pole on the plunger. The pull on the plunger by the lower pole will be a smaller force, but it still is an undesirable force. This magnetic force can be reduced by first spacing the ends of the ridges from the horizontal surfaces of the plunger and lower pole respectively, and second by making grooves in the ends of the ridges. These grooves act to reduce the magnetic pull between the ends of the ridges and the respective surfaces of the plunger and pole, by increasing the effective distances, while at the same time leaving as large a surface area for transfer of flux as possible through the sides of the ridges. The grooves can take a wide variety of forms, including V-shaped or U-shaped in cross-section.

The plunger itself is mounted on two disk springs and biased away from the upper pole such that the valve is in a closed position when no current flows through the coil. The upper disk spring is conical while the lower spring is flat. The disk springs are made of a material that is non-ferromagnetic.

In order to prevent corrosion due to the potentially corrosive gases or liquids flowing through the valve, all exposed surfaces must be made of a non-corrosive material. This material should also be as ferromagnetically permeable as possible. Annealed stainless steel is found to be the best solution in this case, and is used for the plunger upper pole and lower pole. In addition, the valve must be sealed to prevent leakage of potentially harmful gases or liquids. Sealing at the appropriate places can be accomplished by providing annular argon-filled stainless steel O-rings or any other elastomeric sealing members. The two springs which hold the plunger in position move from flexed positions to more severely flexed positions as the plunger moves from a closed valve position towards the upper pole.

Thus the applicant has provided a unique solenoid which has substantial advantages over the conventional solenoid. These advantages are especially useful when the applicant's solenoid is applied for use in a mass flow control valve environment. Due to the increase in efficiency of the applicant's solenoid, the size of a solenoid mass flow control valve can be substantially smaller than a conventional solenoid mass flow control valve which provides substantially the same function. Additionally, by making the springs of the more efficient valve somewhat stiffer, the resonant frequency and thus the frequency response can be increased over that generally found in the conventional solenoid mass flow control valve. Finally, in cases where a valve having lower power requirements than an equivalent conventional solenoid valve is required, the applicant's valve is the ideal solution.

BRIEF DESCRIPTION OF THE DRAWINGS

FIG. 1 shows a perspective view of a solenoid mass flow control valve incorporating the solenoid of applicant's invention;

FIG. 2 is a side elevational view of the valve shown in FIG. 1 partially cut away and sectionalized along line 2—2;

FIG. 5 is a cross-sectional view of the solenoid structure taken along line 5—5 of FIG. 3;

FIG. 6 is a plan view of one of the springs on which the plunger is mounted.

DETAILED DESCRIPTION OF THE INVENTION

Figure 3:
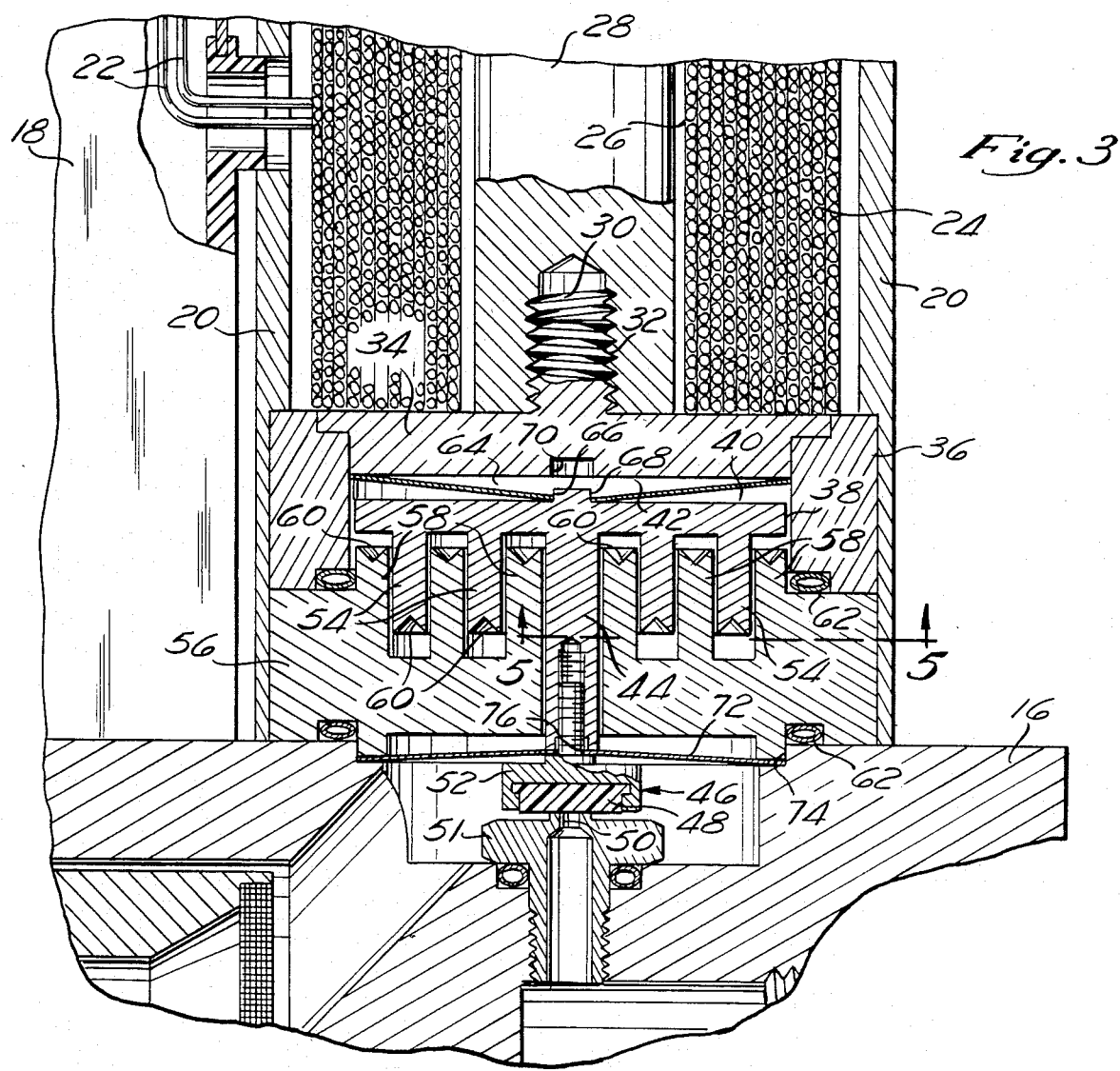
FIG. 3 is a detailed, cross-sectional view along the line 2—2 through the center of the lower portion of the solenoid and the valve seat structure of the valve shown in FIGS. 1 and 2.

FIG. 1 shows a mass flow controller 10 constructed according to the present invention. The controller has an inlet port 12 and an outlet port 14 and a central body 16 through which the gas or liquid flows. On the upper portion of the valve body 16 a controller can 18 and a solenoid can 20 are located. The controller can 18 contains a flow rate sensor and electronic circuitry for monitoring the flow and ordering changes in the valve aperture to maintain an externally commanded flow rate. The solenoid can 20 contains the solenoid structure which is the subject of the present invention.

Referring now to FIGS. 1-6, it can be seen that a set of control wires 22 from the controller can 18 are connected through a conduit to the solenoid can 20. (See FIGS. 2 and 3.) It will become clear as the explanation proceeds that the controller may increase or decrease the aperture of the valve by changing the current which the controller sends through the coil of the solenoid. This is accomplished by increasing or decreasing the voltage potential across the coil.

The solenoid includes a cylindrical coil 24 which has an opening 26 through the center thereof. The opening 26 holds a core 28 which extends from a point flush with the lower end of the coil 24 to a point which extends beyond the upper end of the coil 24. The core 28 is made of a high permeability, ferromagnetic material which is preferably 4750 steel or 49 HI PERM core material. The can or casing 20 surrounds both the core 28 and coil 24. The casing 20 is square, as can be seen in FIGS. 1 and 5. The square structure surrounding a round coil and solenoid structure permits substantial flux flow through the fairly thick corners, including considerable mass surrounding the upper end of the core 28 to enhance flux flow. The casing 20 is preferably made of C1018 or 12L14 mild steel with a layer of chrome plating on the outside. Although the casing 20 is not a high permeability material like numetal, for example, due to the square structure which provides the large volume along the edges of the can 20, the higher permeability is not needed. This permits the can 20 to be a structural element of the valve structure and in addition allows the valve to be made more attractive aesthetically.

The lower end of the core 28, as mentioned previously, is preferably made flush with the lower end of the coil 24. The interior of the core 28 has a threaded opening 30 to receive a threaded protrusion 32 from an upper pole 34. The upper pole 34 is designed to fit against the lower end of the core 28 and the coil 24. The upper pole 34 has a diameter greater than that of the core but less than that of the outside of the coil. The upper pole is preferably made of 430F stainless steel which has been annealed for maximum magnetic softness. An annular upper pole retainer 36 is laser-welded to the outside edge of the upper pole 34. The pole retainer 36 is made of a non-magnetic material which can be, for example, 316 stainless steel. This helps to magnetically insulate the upper pole 34 from the flux which might otherwise be more easily transferred from the inner surfaces of the can 20 directly to the upper pole. Where the higher permeability of the core is found to be unnecessary the upper pole and core can be made of one piece. Preferably this one piece core and upper pole would be made of 430F stainless steel.

A plunger 38 is mounted for movement towards and away from the upper pole 34. The plunger 38 itself is cylindrical and has an upper surface 40 which faces the lower surface 42 of the upper pole 34. The plunger 38 has a diameter greater than that of the core but less than that of the outside of the coil. Further, unlike the plungers typically found in conventional solenoids the length from top to bottom of the plunger is less than the diameter of the plunger. Depending from the center of the underside of the plunger is a cylindrical element 44 which links the plunger to a movable valve member 46 of the valve to be controlled. The valve member has a flexible disk-shaped element 48 which fits over an aperture 50 of the valve seat 51. The flexible element is held in a cylindrical opening of a holder 52 which screws into the end of the cylindrical element which depends from the plunger. It can be seen that as the plunger 38 moves towards the upper pole 34, the valve member 46 will be moved away from the valve aperture 50 and greater amounts of fluid will be permitted to flow through the valve aperture 50.

Also on the under portion of the plunger 38 is a series of concentric, downwardly depending, cylindrical ridges 54. A lower pole 56 is mounted directly below the plunger 38 and upper pole 34 such that it comes in contact or is extremely close to the sidewalls of the can 20. This permits the magnetic flux flowing from the upper portion of the core 28 to flow through the can 20 and into the lower pole 56. The lower pole is cylindrical and has a central aperture which permits the cylindrical valve linkage element 44 depending from the plunger 34 to pass therethrough. Additionally the lower pole has a series of cylindrical, concentric, ridges 58 extending upwardly there from. These ridges 58 are manufactured such that they interleave closely with the downwardly depending ridges 54 of the plunger 38. The lower pole 56 is preferably made of 430F stainless steel which has been annealed for maximum magnetic softness just like the plunger 38 and upper pole 34. It is intended that the magnetic flux flow through the top of the core 28 down through the can 20, through the lower pole 58 and then pass to the plunger 38 to increase the attractive force between the plunger 38 and the upper pole 34. This goal is accomplished by maximizing the surface area between the side surfaces of the ridges 54,58 of the plunger and lower pole and by making the distances between the sides of the ridges 54,58 very small indeed. (On the order of 1,000th of an inch, although a gap between the surfaces of the ridges on the order of 100th of an inch would still work.) The ends of the ridges 54,58 are spaced from the surfaces of the lower pole 56 and plunger 38 respectively in order to reduce the magnetic attraction between the plunger 38 and lower pole 56. The tradeoff here is that as the distance increases, the amount of surface area through which the flux can pass is reduced. The effective distance, however, can be increased while still providing a sufficient surface area for transfer of flux by placing grooves 60 in the ends of the ridges. The surfaces of the grooves 60 are at about 90° and do not reduce noticeably the flux which can flow through the ridges 54,58 but do increase the effective distance between the ends of the ridges and the portions of the lower pole and plunger between the ridges.

The parts of the valve that are not welded together must be sealed to prevent leakage of potentially dangerous fluids from the interior of the valve structure. The leak integrity should be of the order of $1 \times 10^{-9}$ cc of He/second. Seals are necessary between the upper pole retainer 36 and the lower pole 56 as well as between the lower pole 56 and the valve body 16. These seals are formed by using hollow, annular, argon gas-filled stainless steel O-rings 62 or any elastomeric member appropriate for the particular service.

An upper disk spring 64 is mounted in the space between the plunger 38 and the upper pole 34. The disk spring 64 is formed slightly conical in shape, as shown in FIG. 3, and will act to resist movement of the plunger 38 towards the upper pole 34. The upper disk spring 64 has a central aperture 66 which fits over a central protrusion 68 which extends from the top surface 40 of the plunger 38. A corresponding socket 70 is provided in the center of the lower surface 42 of the upper pole 34 for receiving the protrusion 68 of the plunger. The upper end of the plunger protrusion 68 is sized such that it does not "bottom out" against the upper wall of the socket 70. The upper disk spring 64 is mounted loosely in the space between the plunger 38 and upper pole 34 with the outside edges of the spring 64 abutting the inside surface of the upper pole retainer 36 and the surface of the upper pole 34. In the position shown in FIG. 3 with the valve closed, the conical disk spring 64 is slightly compressed, providing some force in keeping the valve closed. The thickness of the upper spring 64 acts as a stop to prevent the plunger 38 from coming so close to the upper pole 34 that it sticks or latches there.

A lower disk spring 72 is flat in its relaxed position. The disk spring is mounted at its edges between the lower pole and the valve body 16 in an annular recess 74. The force to hold the lower disk spring 72 and, in fact, the entire solenoid structure together, comes from four screws 73, FIG. 5, which extend from the side of the valve body opposite the solenoid structure through and into the four corners of the can 20. The lower disk spring 72 has an opening 76 through its center through which extends the upwardly extending threaded portion of valve member 52. The edges of the spring 72 around opening 76 are clamped between the valve member 52 and the linkage element 44. In assembly, the lower disk spring 72 is flexed upwardly in the center to provide a downward valve closing force.

When the solenoid is activated, it can be seen that the plunger 38 will move towards the upper pole 34 and that both the upper disk spring 64 and the lower disk spring 72 will move from somewhat flexed positions to more severely flexed positions. The thickness of the lower disk spring 72 is somewhat greater than that of the upper disk spring 64. Thus, the lower disk spring provides more resistance to plunger movement than the upper disk spring. The disk springs are made of a non-magnetic material which is preferably 316 stainless steel.

Figure 4:
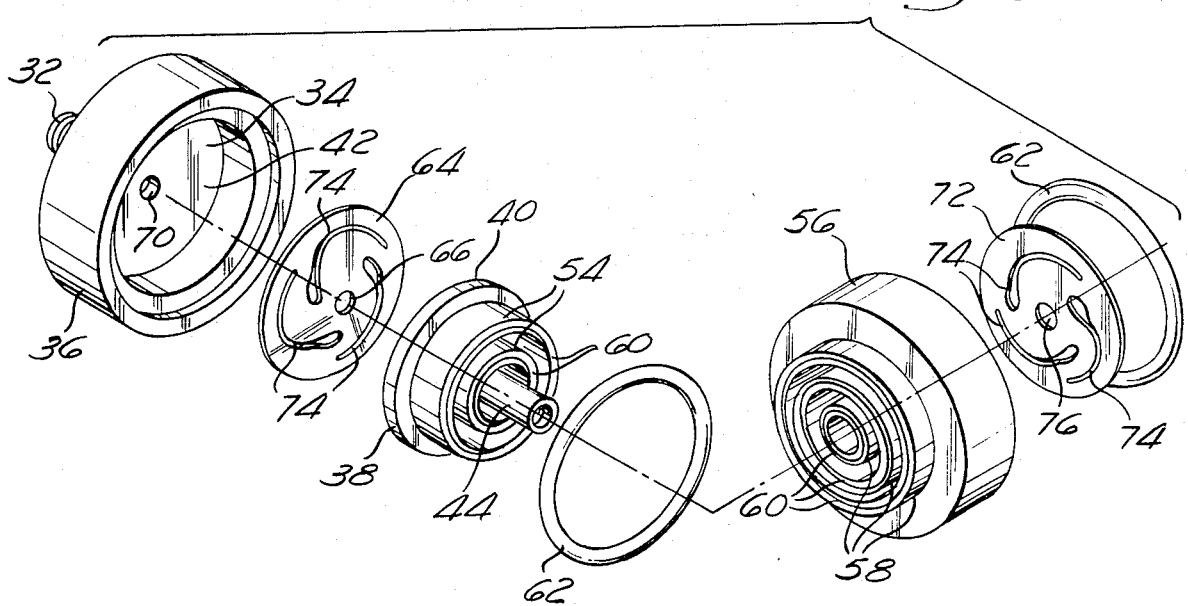
FIG. 4 is an exploded perspective view of the lower portion of the solenoid structure.

The disk springs are shown in more detail in FIGS. 4 and 6. A set of three openings 74 through the springs 64,72 are arranged symmetrically around the center apertures 66,76 of the springs. The openings 74 have a somewhat elongated teardrop shape and curve outwardly and circumferentially from a larger inner end to an outer smaller tail, with the tail of one opening being located radially outwardly from the inner end of the adjacent opening. These openings 74 act to provide a more easy flexure initially and then to provide a stronger resistance to flexing as the spring is more extended. As can be seen in FIG. 3, the springs also act to hold the plunger 38 in a central position to provide substantially frictionless movement for the plunger. The lower spring 72 is also set up to stop the plunger in its movement towards the upper pole at the same point that the physical thickness of the upper spring will prevent such movement. This is accomplished by placing the spring at a position along the linkage 44 between the plunger and the valve seat 52 such that it will abut the underside of the lower pole at the proper position. The springs may be manufactured photographically with chemical milling or stamping.

Thus a high efficiency solenoid is obtained by providing a large surface area between the lower pole 56 and the plunger 38 while at the same time keeping the path length of the magnetic flux through the plunger 38, and the mass of the plunger itself, low. Although there will be some attraction between the sides of the ridges 54,58, the lateral attraction will cancel due to the fact that the ridges are symmetrical. The vertical attraction is minimized due to the distances between the surfaces as well as the grooves 60 in the ends of the ridges. The particular shape of the grooves 60 shown is not critical, and in particular these grooves may be made such that, in cross-section, they have either a U-shape or a V-shape. Although the solenoid structure is described for convenience using the orientation shown in the drawings, the valve is useful in any orientation.

What is claimed is:

1. A solenoid controlled valve comprising:
   a valve;
   a coil having first and second ends, said coil forming an elongated opening through its center;
   a ferromagnetic core having first and second ends, said core extending through said coil, within said opening;
   a first pole located at the first end of both said core and said coil, said first pole having a diameter larger than the diameter of said opening;
   a second pole spaced from and facing said first pole;
   a plunger having first and second ends, said plunger being mounted between said first and second poles for movement through a limited range towards and away from said first pole, said first end of said plunger having a diameter greater than the diameter of said coil opening, said first end further having a surface which faces the surface of said first pole, said plunger being drawn toward said first pole when current flows through said coil;
   a ferromagnetic casing surrounding said core, said coil, said first and second poles, and said plunger;
   said second pole having an outside diameter sized such that the outer surface of said second pole is proximate to the inner surface of said ferromagnetic casing;
   an opening in the middle of said second pole, linkage extending through said opening to operably connect said plunger with said valve to control the flow through said valve;
   said second pole having a plurality of concentric cylindrical ridges arranged symmetrically around said linkage opening and extending from said second pole towards said plunger, said plunger having a complimentary set of concentric cylindrical ridges extending from said plunger towards said second pole, said plunger ridges sized and arranged to maintain at least a portion thereof in close interleaving relationship with said cylindrical second pole ridges throughout the limited range of movement of said plunger to provide a plurality of magnetic flux flow paths normal to the direction of movement of said plunger across the gaps between the sides of said second pole ridges and the sides of said plunger ridges;
   said plunger including a cylindrical disk having a width which is less than its diameter, said plunger ridges depending from one side of said disk at positions spaced radially inwardly from the outer edge of said disk to help distribute the magnetic flux over the surface of the plunger facing said first pole; and
   spring means biasing said plunger to hold said valve in a desired position when no current flows through said coil.

2. The solenoid controlled valve of claim 1 wherein said first pole and said core are made of one piece.

3. The solenoid controlled valve of claim 1 wherein said first pole and said core are made of separate pieces and secured together.

4. The solenoid controlled valve of claim 1 wherein said first end of said core is made substantially flush with said first end of said coil.

5. The solenoid controlled valve of claim 1 wherein said diameter of said first pole is less than the outside diameter of said coil.

6. The solenoid controlled valve of claim 1 wherein said plunger has a diameter greater than its length.

7. The solenoid controlled valve of claim 1 wherein said facing surfaces of each of said plunger and said first pole are substantially flat and parallel to one another.

8. The solenoid controlled valve of claim 1 wherein said core extends beyond said second end of said coil, said ferromagnetic casing extending beyond said second end of said coil and around said core, said casing having a thickness beyond the second end of said coil such that magnetic fluid may easily flow from said core to the sides of said casing.

9. The solenoid controlled valve of claim 8 wherein the width of the casing above the coil is at least equal to the diameter of the coil.

10. The solenoid controlled valve of claim 1 wherein the casing is rectangular in cross-section.

11. The solenoid controlled valve of claim 1 wherein said spring means includes a flat disk spring at one end of said plunger and a conical disk spring mounted between said plunger and said first pole.

12. The solenoid controlled valve of claim 11 wherein said disk springs act to maintain said plunger in a central position while permitting substantially frictionless axial movement, said springs being flexed to bias said plunger towards said desired position away from said pole, said springs being flexed more severely when said plunger is drawn towards said pole.

13. A solenoid comprising:
    first and second poles, each of said poles having an end surface, said first pole being spaced from said second pole and said end surface of said first pole facing said end surface of said second pole;
    a coil mounted in an electromagnetic relationship with said first and second poles to magnetize one of said poles as a north magnetic pole and the other of said poles as a south magnetic pole when said coil is energized;
    a plunger made of magnetically permeable material mounted between said first and second poles for movement through a limited range towards and away from said first pole, said plunger having first and second opposing sides, said first side of said plunger facing said first pole and said second side of said plunger facing said second pole, said plunger being drawn towards said first pole when said coil is energized;
    said plunger having a ridge extending therefrom towards said second pole, said second pole having a recess sized and positioned to accept and interleave closely with at least a portion of said ridge throughout the limited range of movement of said plunger to provide magnetic flux flow paths across the gaps between the side surfaces of said ridge and the side surfaces of said recess in directions normal to the direction of movement of the plunger; and
    said ridge including means for increasing the effective magnetic attraction distance between the end of said ridge and said second pole.

14. The solenoid of claim 13 wherein said ridge is a cylindrical ridge, said recess is a cylindrical recess.

15. The solenoid of claim 13 wherein said effective distance increasing means includes providing a recess in the end of said ridge.

16. The solenoid of claim 14 wherein said recess has a U-shape.

17. The solenoid of claim 15 wherein said recess has a V-shape.

18. The solenoid of claim 14 wherein said cylindrical ridge is centered about the center of the plunger.

19. The solenoid of claim 18 further including a plurality of concentric, symmetrical cylindrical ridges and recesses on each of said plunger and said second pole, said recesses being formed by the spacing between said ridges, the ridges of said second pole being arranged such that they closely interleave with the ridges of said plunger.

20. A solenoid comprising:
first and second poles, each of said poles having an end surface, said first pole being spaced from said second pole and said end surface of said first pole facing said end surface of said second pole;
a coil mounted in an electromagnetic relationship with said first and second poles to magnetize one of said poles as a north magnetic pole and the other of said poles as a south magnetic pole when said coil is energized;
a plunger made of magnetically permeable material mounted between said first and second poles for movement through a limited range towards and away from said first pole, said plunger having first and second opposing sides, said first side of said plunger facing said first pole, and said second side of said plunger facing said second pole, said plunger being drawn towards said first pole when said coil is energized,
one of said plunger and said second pole having a plurality of protrusions extending therefrom towards the other of said plunger and said second pole, the other one of said plunger and said second pole having a plurality of recesses sized and positioned to accept and interleave closely with at least a portion of each of said protrusions throughout the limited range of movement of said plunger to provide magnetic flux flow paths across the gaps between the side surface of said protrusions and the side surfaces of said recesses in directions normal to the direction of movement of the plunger; and
said plunger having an outer edge and at least one of said protrusions or recesses being positioned on said second side of said plunger in a location spaced radially inwardly from said outer edge of said plunger to assist in the distribution of the magnetic flux over the surface of the first side of said plunger.

21. The solenoid of claim 20 wherein said protrusions extend from said plunger and said protrusions are evenly distributed over the second side of said plunger.

22. The solenoid of claim 20 wherein all of the protrusions have substantially the same width.

23. The solenoid of claim 20, 21 or 22 wherein said protrusions are ridges and both said plunger and said second pole have a plurality of ridges and recesses, said recesses being formed by the spacing between said ridges, the ridges of said pole being arranged such that they closely interleave with the ridges of said plunger, said ridges being symmetrically disposed about the center of the plunger and second pole respectively.

24. The solenoid of claim 23 wherein the ridges on each of the plunger and the second pole are formed as concentric cylinders.

25. The solenoid of claim 20 wherein said protrusions are ridges and both said plunger and said second pole have a plurality of ridges and recesses, said recesses being formed by the spacing between said ridges, the ridges of said second pole being arranged such that they closely interleave with the ridges of said plunger, at least one of said ridges including means for increasing the effective distance between the end of said ridge and the bottom of the corresponding recess.

26. The solenoid of claim 25 wherein said effective distance increasing means includes providing a recess in the end of each ridge.

27. The solenoid of claim 26 wherein said recess in the end of each ridge has a U-shape.

28. The solenoid of claim 26 wherein said recess in the end of each ridge has a V-shape.

29. The solenoid of claim 20 wherein said protrusions are ridges and both said plunger and said second pole have a plurality of ridges and recesses, said recesses being formed by the spacing between said ridges, the ridges of said pole being arranged such that they closely interleave with the ridges of said plunger, said plunger ridges have means for increasing the effective distance between the ends of said plunger ridges and said second pole and said second pole ridges have means for increasing the effective distance between the ends of said second pole ridges and said plunger.

30. The solenoid of claim 29 wherein said effective distance increasing means includes providing a recess in the end of each ridge.

31. The solenoid of claim 30 wherein said recess in the end of each ridge has a U-shape.

32. The solenoid of claim 30 wherein said recess in the end of each ridge has a V-shape.

33. The solenoid of claim 13 including a ridge extending from said second pole toward said plunger, said second pole ridge including means for increasing the effective magnetic attraction distance between the end of said second pole ridge and said plunger.

34. The solenoid of claim 33 wherein said effective distance increasing means includes providing a recess in the ends of said ridges.

35. The solenoid of claim 19 wherein the ends of each of said ridges have recesses therein to increase the effective magnetic attractive distance between the ends of the ridges and the respective plunger or second pole.

36. The solenoid of claim 13 or 20 wherein said coil has an opening through the center thereof,
a core mounted in said opening, said core having a first end, said first pole located at the first end of said core.

37. The solenoid of claim 36 wherein said first pole has a diameter greater than that of the coil opening.

38. The solenoid of claim 36 wherein said plunger has a diameter greater than its width.

39. The solenoid of claim 36 including:
a valve;
means for operably connecting said plunger to said valve.

40. The solenoid of claim 36 wherein said pole and said core are made of one piece.

41. The solenoid of claim 36 wherein said first pole and said core are made of separate pieces which are fixed together, the material of said core being of a higher permeability than said pole.

42. The solenoid of claim 36 wherein the first pole portion extends beyond the end of said coil, a ferromagnetic casing surrounding said core, coil, pole and plunger for assisting in the transfer of magnetic flux from said core to said plunger.

43. The solenoid of claim 13 or 20 including a disk spring mounted on each side of said plunger holding said plunger in a central position while permitting axial movement towards and away from said first pole, said springs being flexed such that said plunger is biased towards a position away from said first pole.

44. A solenoid as claimed in claim 43 further comprising means for centering said plunger, said centering means including an aperture in the middle of one of said disk springs, said disk spring having a concave/convex shape and located between said plunger and said first pole, a protrusion extending from the middle of the surface of said plunger which faces said first pole, said protrusion sized to fit snugly within said spring aperture, said disk spring located with its convex surface facing said plunger and said aperture fit around said protrusion.

45. A solenoid as claimed in claim 44 wherein said pole has an opening sized and positioned such that as said plunger surface approaches said pole said protrusion fits within said opening.

46. A solenoid as claimed in claim 43 further comprising a concave/convex disk spring mounted between said plunger and said first pole, said concave/convex disk spring being formed of nonmagnetic material, the structure of said disk spring being such that as the plunger and the first pole approach each other said spring flattens and at the closest approach, the thickness of said spring is all that separates said plunger and said first pole.

47. A solenoid as claimed in claim 46 wherein said concave/convex disk spring is somewhat compressed when said solenoid is in a non-activated condition, said concave/convex disk spring providing a force pushing said pole and said plunger apart, upon activation of said solenoid said disk spring is compressed further between said plunger and said pole.

48. A solenoid comprising:
first and second poles, each of said poles having an end surface, said first pole being spaced from said second pole and said end surface of said first pole facing said end surface of said second pole;
a coil mounted in an electromagnetic relationship with said first and second poles to magnetize one of said poles as a north magnetic pole and the other of said poles as a south magnetic pole when said coil is energized;
a plunger made of magnetically permeable material and mounted between said first and second poles for movement through a limited range towards and away from said first pole, said plunger having first and second opposing sides, said first side of said plunger facing said first pole, and said second side of said plunger facing said second pole, said plunger being drawn towards said first pole when said coil is energized;
said plunger having an outer circumferential edge, a protrusion extending from said second side of said plunger towards said second pole, a recess formed in said second pole sized and positioned to accept and interleave closely with at least a portion of said protrusion throughout the limited range of movement of said plunger to provide magnetic flux flow paths from said second pole to said plunger in directions normal to the direction of movement of said plunger, said protrusion extending from said second side of said plunger at a location spaced radially inwardly from said outer edge of said plunger to assist in the distribution of magnetic flux over said first side of said plunger facing said first pole.

* * * * *